No. 618,189. Patented Jan. 24, 1899.
J. & K. VAN SETRES.
HORSESHOE.
(Application filed Oct. 25, 1898.)
(No Model.)
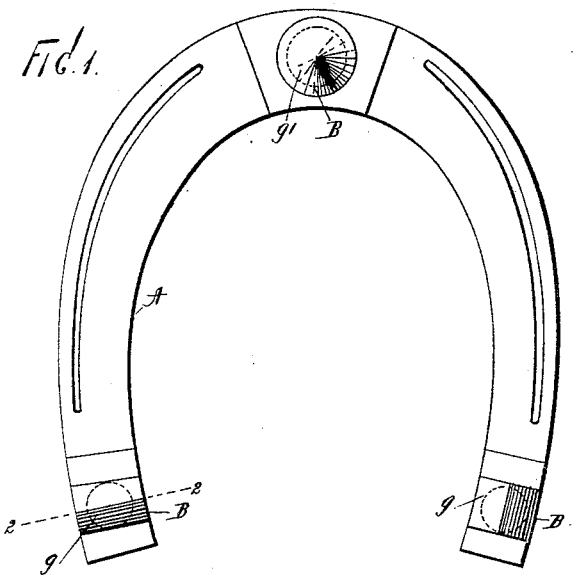
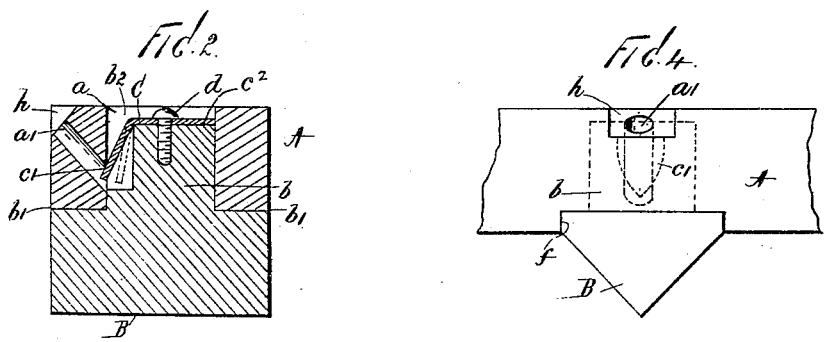
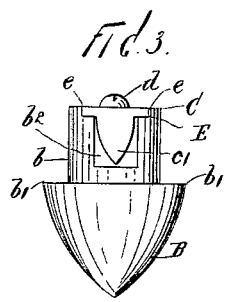
WITNESSES
John Buckler,
F. A. Stewart.
INVENTORS
Jacob van Setres
Krijn van Setres
BY
Edgar Tate &Co.
ATTORNEYS

UNITED STATES PATENT OFFICE.

JACOB VAN SETRES AND KRŸN VAN SETRES, OF PATERSON, NEW JERSEY.

HORSESHOE.

SPECIFICATION forming part of Letters Patent No. 618,189, dated January 24, 1899.

Application filed October 25, 1898. Serial No. 694,503. (No model.)

*To all whom it may concern:*

Be it known that we, JACOB VAN SETRES and KRŸN VAN SETRES, citizens of the United States, residing at Paterson, in the county of Passaic and State of New Jersey, have invented certain new and useful Improvements in Horseshoes, of which the following is a full and complete specification, such as will enable those skilled in the art to which it appertains to make and use the same.

This invention relates to that class of horseshoes which are provided with detachable calks; and it has for its object to provide a simple and improved horseshoe of this character in which various forms of calks may be used in connection with the same shoe-body and readily and conveniently applied thereto or removed therefrom.

The invention is fully disclosed in the following specification, of which the accompanying drawings form a part, in which the separate parts of our improvement are designated by the same letters of reference in each of the views, and in which—

Figure 1 is an inverted plan view of a horseshoe embodying our improvements. Fig. 2 is a detail transverse sectional view taken on the line 2 2, Fig. 1. Fig. 3 is a detail side view of the conical form of calk comprised in our invention; and Fig. 4 is a detail side view of a portion of the shoe, showing the calk in position.

Referring to the drawings, A designates the body of the shoe, which is provided with openings $a$, intersected by perforations $a'$, extending upwardly and outwardly in a diagonal plane toward the top portion of the side edge of the shoe. These openings $a$ are adapted to receive a corresponding stem or shank $b$ upon the top of a calk B, said shank forming shoulders $b'$, which are adapted to be seated against the bottom edge or face of the shoe. The shank $b$ carries a flat spring C, which is secured in its upper end, preferably by means of a screw $d$, and which has a downwardly and outwardly projecting free portion $c'$, adapted to be accommodated in a recess $b^2$, extending in a longitudinal manner in the side of the shank or stem $b$. The base portion of the spring-plate C is preferably flattened at its top, as shown at $c^2$, which flattened portion receives the securing-screw $d$, and is preferably braced between the shoulders $e$ and $e$ of a corresponding recess E, formed in the top end of the stem or shank $b$.

In operation it is only necessary to insert the stem or shank $b$ upwardly in the corresponding opening $a$ of the shoe, when the free portion $c'$ of the spring will expand outwardly and engage the lower inner end portion of the supplementary perforation $a'$, so that the calk is locked against outward movement. To release the calk and permit of its disengagement from the shoe, it is only necessary to insert a suitable rod or tool through the perforation $a'$ for the purpose of depressing the free projecting portion $c'$ of the spring inwardly in its recess $b^2$, when the calk can be readily withdrawn and detached from the shoe, as will be readily understood.

We prefer to provide a recess $f$ in the bottom surface of the shoe conforming to the shouldered or body portion of the calk and providing a seat for the same, so that the calk is braced against lateral movement and consequent strain upon the securing-spring.

In practice the body of the calk may be beveled or V-shaped, as shown at $g$, or it may be conical, as shown at $g'$, or any other suitable form or contour of the body portion may be provided. When the V-shaped calks are employed, they can be relatively arranged at right angles, as shown in Fig. 1 of the drawings, to offer resistance against both longitudinal and lateral movement, or the V-shaped calks may be employed in conjunction with a conical toe-calk, as shown.

We prefer to bevel the top edge of the side portion of the shoe, as at $h$, to facilitate the entrance of the operating tool or rod into the top end of the perforation $a'$ when the shoe is upon the foot of the animal.

Having thus fully described our invention, we claim as new and desire to secure by Letters Patent—

1. An improved horseshoe, comprising the body having a main opening intersected by a perforation extending to the side of the shoe, in combination with a calk having a stem or shank corresponding to said main opening and carrying a spring embodying a laterally-projecting free portion adapted to engage the outwardly-extending perforation when the shank is inserted within the shoe, substantially as and for the purpose set forth.

2. An improved horseshoe, comprising the body having an opening intersected by a supplementary perforation extending diagonally upwardly and outwardly toward the top of the side portion of the shoe, in combination with a calk having a shank or stem corresponding to said main opening and recessed in a longitudinal manner, said calk carrying a spring secured to the top of its shank or stem and embodying a free downwardly and outwardly projecting portion adapted to engage the lower end of the supplementary perforation when the stem is in position within the shoe, substantially as and for the purpose set forth.

3. An improved horseshoe, comprising the body having an opening intersected by a supplementary perforation extending diagonally upwardly and outwardly to the top of the side portion of the shoe, in combination with a calk provided with a shank or stem corresponding to said main opening and forming a shoulder adapted to bear against the under side of the shoe, the top end of the stem of said calk being provided with a recess in which is fitted and secured the base portion of a flat spring having an outwardly and downwardly projecting arm or portion operating in a recess in said stem and adapted to engage the bottom end of said supplementary perforation when the calk is in position in the shoe, substantially as and for the purpose set forth.

4. In an improved horseshoe of the class described, the combination, with the shoe having an opening intersected by an outwardly-extending supplementary perforation, of a calk having a shouldered portion bearing against the under side of the shoe and provided with a projecting shank or stem corresponding to and fitting within said main opening in the body of the shoe, said stem carrying an outwardly-projecting spring adapted to engage the inner end of said outwardly-extending supplementary perforation, substantially as and for the purpose set forth.

In testimony that we claim the foregoing as our invention we have signed our names, in presence of the subscribing witnesses, this 19th day of October, 1898.

JACOB VAN SETRES.
KRYN VAN SETRES.

Witnesses:
JOHN DECKER,
HENRY VANDERMAST.